Patented Oct. 4, 1932

1,880,741

UNITED STATES PATENT OFFICE

MAITLAND C. BOSWELL, OF TORONTO, ONTARIO, CANADA

REDUCTION OF SULPHUR DIOXIDE

No Drawing. Application filed May 12, 1928. Serial No. 277,398.

This invention relates to the reduction of sulphur dioxide, which is a waste product in many industries, and my object is to devise a process of and means for, reducing the dioxide which will be both rapid and efficient.

I attain my object by preparing a special catalyst and thereafter passing sulphur dioxide and hydrogen or hydrogen containing gas over the catalyst at a temperature sufficiently high for effective reaction, the result of which is elemental sulphur and water.

The catalyst for this process can be made in any of the following ways:

(1) Finely divided iron sulphide, nickel sulphide or cobalt sulphide, preferably prepared by wet precipitation, or any mixture of these sulphides, is oxidized. This is most conveniently done by allowing the sulphide to stand in air or oxygen at room temperature or by heating in air or oxygen so as to evolve sulphur dioxide and either partially or completely convert the sulphide into the oxide of the metal or metals. This is now treated with a mixture of sulphur dioxide and hydrogen or sulphur dioxide followed by hydrogen—in either case preferably at a temperature of 300° C., although there is a wide range of temperature which may be used with a reasonable degree of efficiency.

(2) Finely divided iron oxide, nickel oxide or cobalt oxide, or any mixture of these, or any compound of these metals which on heating gives the oxide, is treated with a mixture of sulphur dioxide and hydrogen or sulphur dioxide followed by hydrogen preferably at a temperature of 300° C. A wide range of temperature may also be used here. (3) Iron sulphate, nickel sulphate or cobalt sulphate or any mixture of these is heated to a high temperature, preferably to above 600° C. The temperature is then lowered and preferably at a temperature of 300° C. sulphur dioxide and hydrogen or sulphur dioxide followed by hydrogen are passed over the catalyst.

(4) Metallic iron, nickel or cobalt or any mixture of them is treated with steam and sulphur dioxide at a temperature preferably of 300°–450° C. followed by hydrogen at a temperature preferably of 300° C. or a mixture of hydrogen and sulphur dioxide.

(5) Any compound of iron, nickel or cobalt is suitably treated to convert it into the metal or oxide or sulphide or sulphate of the metal and these latter can then be converted into the active catalyst by the methods described above under (1), (2), (3) and (4).

(6) Sulphides, oxides, sulphates of other metals can be used as catalysts and prepared as described above in the cases of iron, nickel and cobalt but are much less active.

The process of reduction is carried out by placing the catalyst in tubes or chambers preferably using a porous material of large surface as catalyst carrier, as for instance asbestos, kieselguhr, porous brick or tile. The gas containing sulphur dioxide is mixed with hydrogen or gas containing free hydrogen preferably in the proportion of one volume of sulphur dioxide to two volumes of hydrogen and the mixed gases passed over the catalyst at a temperature preferably of 300° C. This latter temperature may vary and the reaction $SO_2 + 2H_2 = S + 2H_2O$ which takes place can be carried out by the catalyst at a temperature as low as 180° C. and also at temperatures somewhat higher than 300° C. The optimum temperature varies depending upon the particular catalyst employed and the particular conditions used in its preparation. 275° to 325° C. is an excellent range of operating temperature for industrial use enabling the use of high gas velocities. The catalyst does not assume its maximum activity at once but does so only after it has been in use for some hours. Exceedingly active iron catalysts have been made which sustain a high reaction velocity at a temperature of 180° C. This process is remarkably efficient. By regulating the proportion of hydrogen entering the system, after the catalyst has attained its maximum activity, so as to approximate as closely as possible to the volumes required by the equation $2H_2 + SO_2 = 2H_2O + S$, that is 1 vol. of sulphur dioxide to 2 vols. of hydrogen, the gases can be passed at a very high velocity without any sulphur dioxide or hydrogen escaping as such from the apparatus. That is, the above reaction proceeds practically quantitatively and elementary molten sulphur flows out of the reaction tube.

As the catalyst in its preparation as described above probably passes through the oxide in every case, it might appear at first sight that the mechanism of the reaction in the reduction of $SO_2$ to $S$ simply involves the employment of iron, nickel or cobalt oxides partially or completely reduced by hydrogen and that these activate hydrogen for the reduction of sulphur dioxide, as in the well known hydrogenation processes. This, however, is not the case. The mechanism of the reaction is quite otherwise and the composition of the catalyst entirely different. An exhaustive study has been made by me of the properties of the catalysts at various stages of their preparation.

Among other facts the following may be cited for the purpose of proving that the reaction involved here and the catalyst employed are quite different from those of the ordinary hydrogenation process.

It is well known that the hydrogenation catalysts used in hydrogenating unsaturated compounds and in catalytic reduction are particularly sensitive to sulphur which acts as a catalytic poison for these catalysts and very quickly inactivates them. This indicates at once that the catalyst for the reduction of $SO_2$ either must function with a different mechanism or have a different composition or both of these conditions may maintain.

In the preparation of the catalyst when the oxide stage has been reached it is found that in this condition large absorption of sulphur dioxide occurs at 300° C., when this gas is passed. Upon now heating with hydrogen at 300° C. water is formed at the outset in large amount with the formation of only a very small amount of sulphur, and unless the temperature is raised little hydrogen sulphide is evolved.

Upon now passing a mixture of hydrogen and sulphur dioxide in the ratio of two to one by volume, water is formed without at first the appearance of the corresponding amount of sulphur. This condition is maintained for only a few minutes after which the reaction results in the complete transformation of all the sulphur dioxide and hydrogen into sulphur and water. That is, the active catalyst has formed and it contains sulphur.

This was confirmed by quantitative analysis of the active catalyst. It was found that the ratio of metal to sulphur in the active catalyst is 1 atom of metal to 1.7–1.8 atoms of sulphur. Care was taken to remove all free sulphur from the samples analyzed by extraction with sulphur solvents before analysis.

It is probable that the active catalyst functions either (1) as a partially reduced disulphide, as $FeS_2$ forming an active surface film by partial reduction by hydrogen, or (2) by the reduction of the disulphide by hydrogen to form hydrogen sulphide, the reaction of this with sulphur dioxide and the regeneration of the disulphide according to the following reactions—

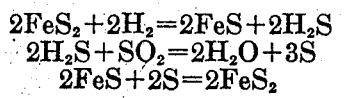

$$2FeS_2 + 2H_2 = 2FeS + 2H_2S$$
$$2H_2S + SO_2 = 2H_2O + 3S$$
$$2FeS + 2S = 2FeS_2$$

the net result being $2H_2 + SO_2 = 2H_2O + S$. However, both the analysis and the behaviour pointed to the existence of an extremely active partially reduced disulphide.

Thus whether the catalyst is made from the metal, the sulphide, the sulphate, the oxide, or starting with any other compound of the metal, it reaches eventually, when full activity has been attained, the same condition, viz—a compound or complex containing a high percentage of sulphur. Thus the catalyst is quite different from the hydrogenation catalysts usually used.

I am aware that there is a process for reducing sulphur dioxide utilizing steam and a catalyst consisting of sulphides, sulphites or sulphates of the alkali or alkali earth metals. This process is applicable only to alkali sulphides and alkali earth sulphides and the addition of steam is essential, for the reaction involves the hydrolysis of sulphides to give hydrogen sulphide and the hydroxide of the metal thus $$CaS + H_2O \rightarrow Ca(OH)_2 + H_2S$$

with the subsequent reaction of both of these with sulphur dioxide to give respectively sulphur and a sulphite, thus—

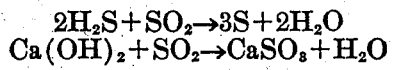

$$2H_2S + SO_2 \rightarrow 3S + 2H_2O$$
$$Ca(OH)_2 + SO_2 \rightarrow CaSO_3 + H_2O$$

The sulphite is then reduced by the reducing gas to sulphide which is then in a condition to repeat the cycle of reactions. Thus the catalyst used in this process, according to the claims, must be one which is capable of being hydrolyzed to give hydrogen sulphide, that is, it must be a sulphide of the alkali or alkali earths metals (or sulphites or sulphates of these metals which on reduction will give sulphides); and steam is vital to the process.

Now my invention is quite different as it utilizes elements and compounds which do not react with steam to give hydrogen sulphide. Indeed the use of steam is not essential to the process.

What I claim as my invention is:

1. A process of producing a catalyst for the reduction of sulphur dioxide which consists in acting on an oxide of a metal of the iron group with sulphur dioxide and hydrogen.

2. A process of producing a catalyst for the reduction of sulphur dioxide which consists in acting on an oxide of a metal of the iron group with sulphur dioxide and hydrogen at a temperature of approximately 300° C.

3. A process of reducing sulphur dioxide which consists in preparing a catalyst by acting on an oxide of a metal of the iron group with sulphur dioxide and hydrogen for a length of time and at a temperature sufficient to cause the oxide to take up sulphur, forming a porous mass of said catalyst and thereafter passing sulphur dioxide and hydrogen through the mass in substantially the proportions of 1 to 2 and at a temperature sufficiently high for effective reaction.

4. A process of reducing sulphur dioxide which consists in preparing a catalyst by acting on a metallic oxide with sulphur dioxide and hydrogen for a length of time and at a temperature sufficient to cause the oxide to take up sulphur, forming a porous mass of said catalyst and thereafter passing sulphur dioxide and hydrogen through the mass in substantially the proportions of 1 to 2 and at a temperature of approximately 300° C.

5. A process of reducing sulphur dioxide which consists in producing a catalyst having the constitution of a partly reduced sulphide of a metal of the iron group and thereafter passing sulphur dioxide and hydrogen over the catalyst at a temperature sufficiently high for effective reaction.

6. A process of reducing sulphur dioxide which consists in passing a mixture of sulphur dioxide and hydrogen over a catalyst having the constitution of a partly reduced sulphide of a metal of the iron group.

7. A process of reducing sulphur dioxide which consists in producing a catalyst having the constitution of a partly reduced sulphide of a metal of the iron group and thereafter passing sulphur dioxide and a reducing gas over the catalyst at a temperature sufficiently high for effective reaction.

8. A process of reducing sulphur dioxide which consists in passing a mixture of sulphur dioxide and a reducing gas over a catalyst having the constitution of a partly reduced sulphide of a metal of the iron group.

9. A catalyst for the reduction of sulphur dioxide having the constitution of a partly reduced iron disulphide.

10. A process of producing a catalyst for the reduction of sulphur dioxide which consists in acting on an oxide of a metal of the iron group with sulphur dioxide and a reducing gas.

11. A catalyst comprising a complex of a metal of the iron group with sulphur containing more than 1 and less than 2 atoms of sulphur for each atom of the metal.

12. A process of producing a catalyst for the reduction of sulphur dioxide which consists in sulphurizing a metal of the iron group with sulphur dioxide by the action of a reducing gas to produce a complex having the constitution of a partly reduced iron disulphide.

13. A process for the reduction of sulphur dioxide which consists in passing a mixture of sulphur dioxide over and in ultimate contact with a catalyst having the constitution of a partly reduced disulphide of a metal of the iron group in intimate mixture with a reducing gas and at a temperature sufficiently high for effective reaction between the gases.

Signed at Toronto this 8th day of May, 1928.

MAITLAND C. BOSWELL.